Oct. 25, 1960
A. A. SOLIS
2,958,024
POWER STEERING APPARATUS
Filed Oct. 5, 1954
5 Sheets-Sheet 3
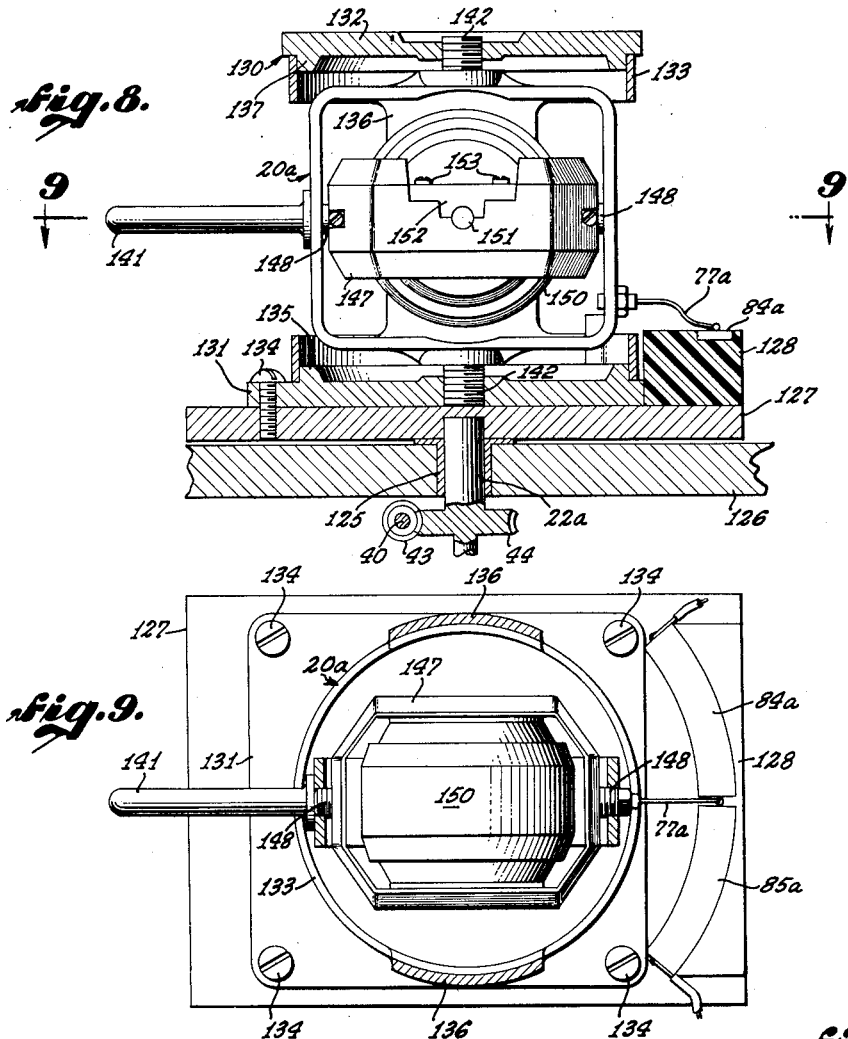
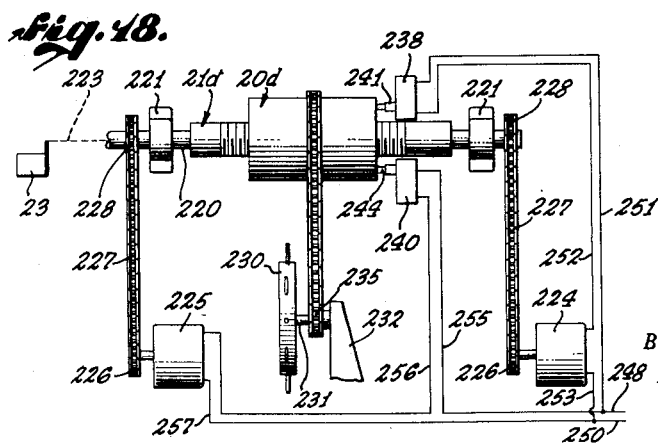
Alfred A. Solis,
INVENTOR.
BY George J. Smyth
ATTORNEY.

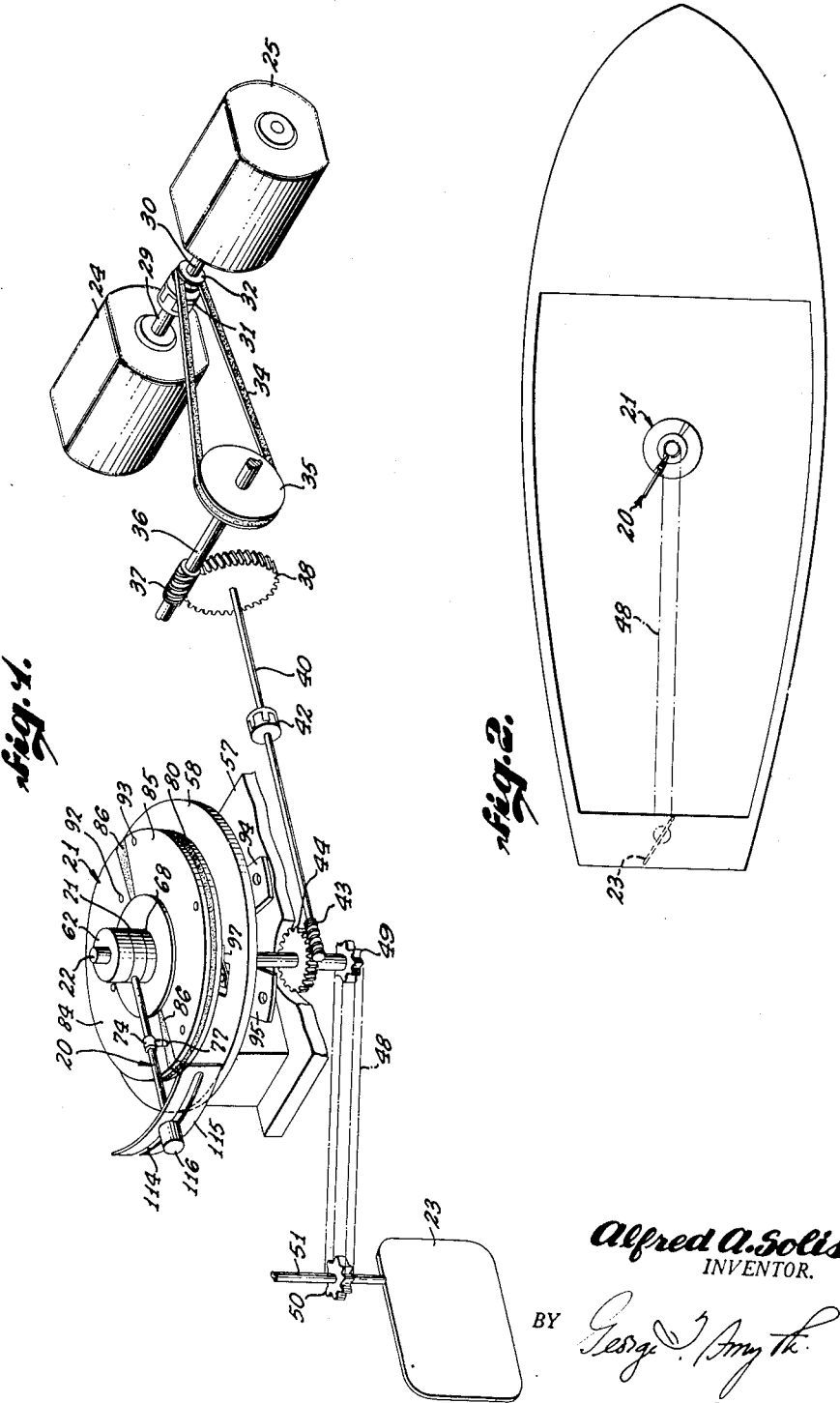

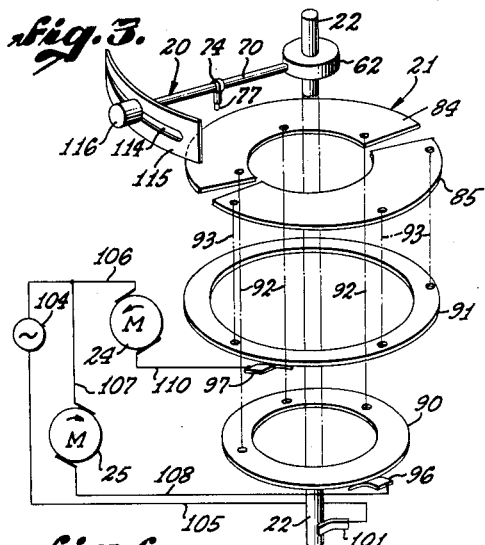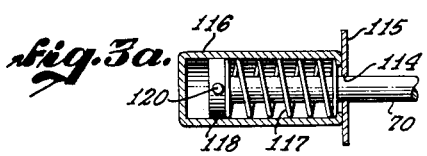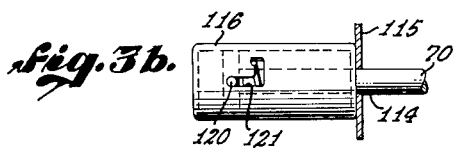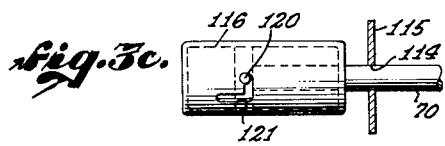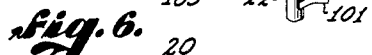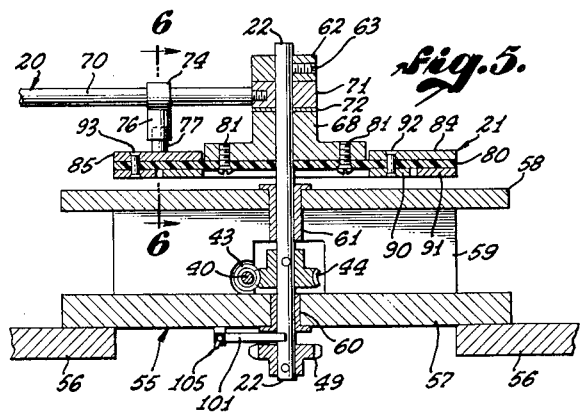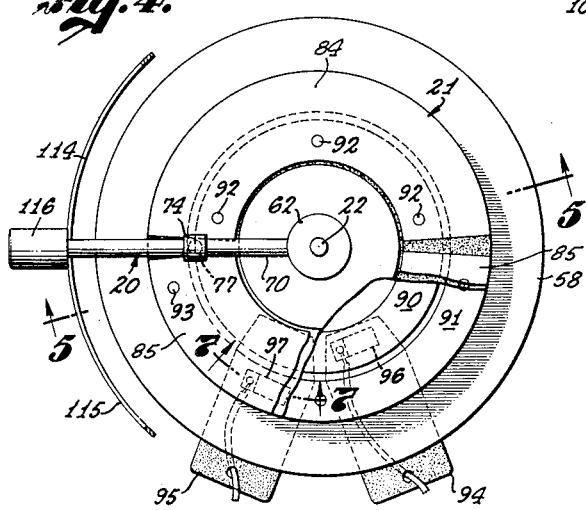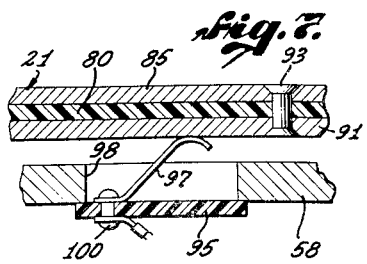
Alfred A. Solis,
INVENTOR.

Oct. 25, 1960

A. A. SOLIS 2,958,024

POWER STEERING APPARATUS

Filed Oct. 5, 1954

Alfred A. Solis,
INVENTOR.

BY George W. Smyth
ATTORNEY.

Oct. 25, 1960     A. A. SOLIS     2,958,024
POWER STEERING APPARATUS

Filed Oct. 5, 1954     5 Sheets-Sheet 5

Alfred A. Solis,
INVENTOR.

BY George J. Smyth
ATTORNEY.

| United States Patent Office | 2,958,024
Patented Oct. 25, 1960 |
|---|---|

2,958,024

POWER STEERING APPARATUS

Alfred A. Solis, 22720 Susana, Torrance, Calif.

Filed Oct. 5, 1954, Ser. No. 460,386

7 Claims. (Cl. 318—19)

This invention relates to apparatus for steering small boats and the like and, more particularly, is directed to power-actuated apparatus for causing the rudder of a boat or the like to follow automatically the movements of a steering member.

Follow-up systems to cause the rudder of a boat to move in accord with the movements of a steering member on the boat remote from the rudder are well known. In general, however, such systems have been complicated in structure and in mode of operation to such extent that they are not suited for use on small boats. The present invention is directed to the need for an inexpensive and simple power steering apparatus of few working parts that may be quickly adapted for use on a small boat. In this regard an important feature of the preferred practice of the invention is that the apparatus is embodied in a relatively compact power unit for use at a forward position on a boat, the unit including means to transmit steering power from the forward position to the rearward rudder. The unit is adapted for installation on a small boat in a rapid manner without requiring any specialized skill and is further adapted for operative connection with the rudder in a simple manner requiring minimum installation labor.

All of the particular embodiments of the invention disclosed herein are characterized by the use of two control members in association with a shaft or an equivalent rotary member, the shaft or the like being connected both with the rudder of the boat and with reversible motor means for actuating the rudder. One of the two control members is a steering member that serves to determine the course of the boat and may, therefore, be aptly termed the director. This director is rotatable independently of the shaft. The second control member, which may be aptly termed the follower, is fixedly mounted on the shaft adjacent the director.

Two separate circuits for energizing the reversible motor means in opposite directions are controlled by two corresponding switches and the two switches, in turn, are controlled by the rotary position of the director relative to the rotary position of the follower. Thus if the director is displaced in either rotary direction from a normal predetermined rotary position relative to the follower, one of the two switches is thereby operated to energize the motor means for rotation of the shaft to restore the follower to its normal relationship with the directing control member.

In effect, the shaft is rotated to sense the position of the director and governs the rudder position accordingly.

To place such a unit in operation it is merely necessary to mount it on the boat structure at a desired forward position and to connect it to the rudder by suitable operating means. In this regard, a feature of the invention is the concept of using a sprocket chain to interconnect the rudder and the unit, a sprocket chain being readily adaptable to transmit power over various distances.

A problem encountered in the construction of such a unit is to provide switch means that will be accurately responsive to the relative positioning of the two control members. In one practice of the invention this problem is solved by placing two contacts on one of the control members and a cooperating contact on the other control member. A feature of this practice of the invention is the use of a releasable latch to maintain the director in selected positions, the latch overcoming the tendency of friction to cause the director to follow the movement of the follower.

In another practice of the invention the switch problem is solved by employing a pair of nested eccentric control members in combination with a pair of peripheral micro switches. The two nested eccentric members constitute the director and follower, respectively and the arrangement is such that relative rotation of the two eccentric members away from a predetermined normal relation causes selective operation of the two micro switches.

In a third practice of the invention one of the two control members is in the form of a rotary cam and the other control member carries a pair of cam-actuated switches. The two switches respond to relative rotation between the two control members.

A fourth practice of the invention employs a screw of one of the control members and a rotary nut thereon for the other control member. The rotary nut is the director and operates a pair of switches positioned in its path of longitudinal movement.

The invention may, if desired, be embodied in a fully automatic steering system and a feature of a further practice of the invention is the use of gyro-pilot mechanism for this purpose. Exceptional simplicity is achieved in such a fully automatic system by mounting the gyroscope of the director in such manner that the gyro assembly may be manually rotated bodily for a change in course. Thus with the gyroscope idle the directing control member may be freely manually manipulated to serve as a remote control tiller and with the gyroscope energized the director may be manipulated in the same manner by the application of sufficient manual force to overcome the gyroscope and will advantageously automatically maintain any direction in space to which it may set in this manner.

The various features and advantages of the invention will be apparent from the following detailed description, considered with the accompanying drawings.

In the drawings, which are to be regarded as merely illustrative:

Figure 1 is a simplified perspective view of one embodiment of the invention;

Figure 2 is a plan view of a small boat incorporating the structure shown in Figure 1;

Figure 3 is an exploded view of the two control members and associated structure in this first embodiment of the invention;

Figure 3a is a fragmentary sectional view of the handle of the directing control member illustrating the manner in which the handle functions as a frictional latch.

Figure 3b is a plan view of the handle in frictional latching position;

Figure 3c is a similar plan view of the handle in its retracted or ineffective position;

Figure 4 is a plan view of the two control members;

Figure 5 is a vertical section taken as indicated by the line 5—5 of Figure 4;

Figure 6 is a section taken as indicated by the line 6—6 of Figure 5;

Figure 7 is a fragmentary section taken as indicated by the line 7—7 of Figure 4;

Figure 8 is a view partly in side elevation and partly in section illustrating a second embodiment of the invention;

Figure 9 is a section taken as indicated by the line 9—9 of Figure 8;

Figure 18 is a schematic view of a fifth embodiment of the invention; and

Figure 19 is a diagram of the switches in Figure 18.

Figure 10:
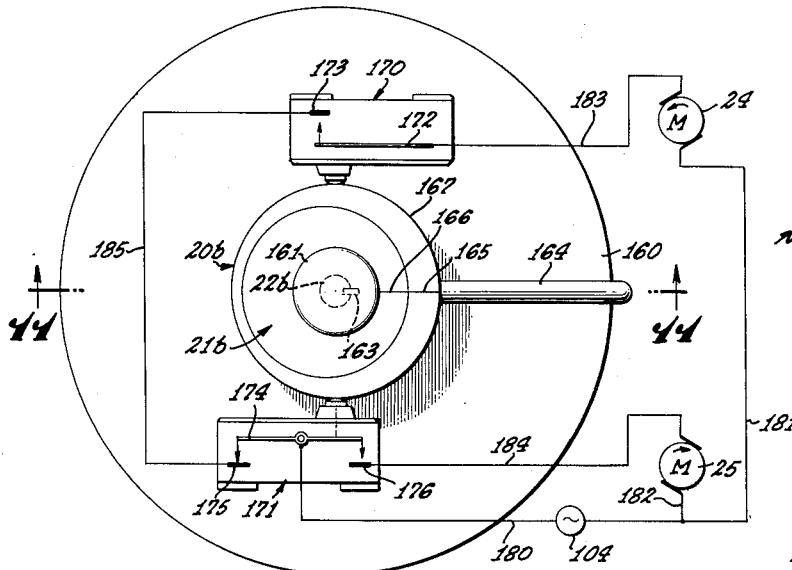
Figure 10 is a schematic plan view of the two control members and associate switches of a third embodiment of the invention.

As best shown in Figure 1 the principal parts of the first embodiment of the invention include: a first control member or director 20; a second control member or follower, generally designated by numeral 21; an upright shaft 22 on which the follower is fixedly mounted, this shaft being mechanically connected with the boat's rudder 23; and motor means comprising a pair of oppositely running motors 24 and 25 that are mechanically connected with the shaft 22.

The two motors 24 and 25 have corresponding shafts 29 and 30 connected together by a coupling 31 and a drive sheave 32 is mounted on one of these two shafts. Since the two motors are wired to rotate in opposite directions the motors may be energized selectively to operate the drive sheave 32 in opposite directions. A drive belt 34 connects the drive sheave 32 with a second larger driven sheave 35 on a counter shaft 36. A worm 37 on the counter shaft 36 meshes with a worm gear 38 on a shaft 40 by a coupling 42 carries a worm 43 in mesh with a worm gear 44 on the upright shaft 22. Thus it is apparent that energization of the two motors 24 and 25 selectively will cause the upright shaft 22 carrying the follower 21 to rotate selectively in opposite directions.

The upright shaft 22 may be connected mechanically with the rudder 23 in any suitable manner. In this instance, for example, a suitable sprocket chain 48 operatively connects a sprocket 49 on the upright shaft 22 with a second sprocket 50 on the shaft 51 of the rudder 23.

As shown in Figure 5 the two control members are carried by a support assembly, generally designated 55, which is mounted on transverse structure 56 of the boat. The support assembly 55 comprises a lower base plate 57 and an upper plate 58 together with vertical structure 59 interconnecting the two plates. The upright shaft 22 extends through suitable bearings 60 and 61 in the two plates 57 and 58 respectively of the support assembly and carries on its upper end a collar 62 secured by a set screw 63. Spaced below the collar 62 on the shaft 52 is a hub member 68 which is fixedly connected to the shaft.

The director 20 comprises a radial rod 70 which is rotatably mounted on the shaft 22 by means of a second collar 71 positioned between the collar 62 and the hub member 68. A suitable washer 72 is interposed between the collar 71 and the hub member 78 to reduce friction. The radial rod or director 20 carries what may be termed a brush holder 74 secured thereto by a set screw 75 (Figure 6), the brush holder having a downwardly extending cylindrical portion 76. A suitable contact or brush member in the form of a plunger 77 is slidably mounted in the cylindrical portion 76 of the brush holder and is continuously urged downward against the follower 21 by a suitable spring 78 concealed inside the brush holder.

The second control member or follower 21 includes the hub member 68 and a disc 80 of non-conducting material attached to the under side of the hub member by suitable screws 81. Mounted on the upper surface of the non-conducting disc 80 is a pair of contacts 84 and 85 in the form of arcuate plates for cooperation with the contact or brush member 77. As best shown in Figure 6 the ends of the two contact plates 84 and 85 are spaced apart by a distance slightly greater than the width of the brush member 77 and this intervening space is occupied by a rib 86 of the non-conducting disc 80. The rib 86 is flush with the surfaces of the two contact plates 84 and 85 to provide a continuous plane surface for sliding contact with the brush member 77.

On the under side of the non-conducting disc 80 are two coaxial slip rings 90 and 91, which are electrically connected with the two contacts 84 and 85 respectively. In the construction shown the inner slip ring 90 is electrically connected to the contact 84 by means of rivets 92 and the outer slip ring 91 is connected to the contact 85 by rivets 93, these two sets of rivets being indicated by correspondingly numbered broken lines in Figure 3.

To complete the circuit shown in Figure 3 suitable brush means is provided to cooperate with each of the slip rings 90 and 91 and a third brush means is provided with the upright shaft 22. In the construction shown in the drawing two non-conducting plates 94 and 95 are provided to carry corresponding brush members 96 and 97 for contact with the slip rings 90 and 91 respectively. As shown in Figure 7 each of the non-conducting plates 94 and 95 is mounted on the under side of the upper plate 58 of the support assembly, the support assembly plate having an opening 98 through which the corresponding brush member extends into contact with the corresponding slip ring.

Each of the two brush members 96 and 97 comprises a leaf spring member as shown in Figure 7 with the base of the leaf spring member attached to the corresponding non-conducting plate by a suitable rivet 100. As shown in Figure 5 a similar leaf spring 101 is mounted on the under side of the base plate 57 of the support assembly to serve as a brush member in contact with the periphery of the upright shaft 22.

As shown in Figure 3 one side of a suitable E.M.F. source 104 is connected to the brush member 101 by a wire 105; the other side of the E.M.F. source is connected to one side of the two motors 24 and 25 by wires 106 and 107; brush member 96 is connected to the second side of the motor 25 by a wire 108; and brush member 97 is connected to the second side of the motor 24 by a wire 110.

It is apparent that when the brush member 77 carried by the indicator 20 is in the space between the two contact plates 84 and 85 with the brush member resting on the non-conducting rib 86 as shown in Figure 6, both of the motors 24 and 25 will be de-energized. If the indicator 20 is moved out of this normal position relative to the follower 21, one of the two motors will be energized automatically to rotate the follower in a direction to restore the relationship shown in Figure 6.

If the brush member 77 touches the contact plate 84 the following circuit will be energized to cause the required follow-up rotation of the follower 21; wire 105 from one side of the E.M.F. source 104, brush member 101, shaft 22, the director 20, brush member 77, contact plate 84, rivets 92, inner slip ring 90, brush member 96, wire 108, motor 25, wire 107, and wire 106 to the second side of the E.M.F. source.

On the other hand if the brush member 77 touches the second contact plate 85, motor 24 will be automatically energized to rotate the follower 21 in a direction to restore the normal relationship. The circuit through motor 24 may be traced as follows; wire 105 from one side of the E.M.F. source 104, brush member 101, shaft 22, the director 20, brush member 77, contact plate 85, rivets 93, outer slip ring 91, brush member 97, wire 110 to one side of the motor 24, and wire 106 from the other side of motor 24 to the second side of the E.M.F. source. It is apparent that the brush member or contact 77 and the two contacts 84 and 85 provide the equivalent of two switches to control the two motor circuits, the brush or contact 77 and the contact 84 being equivalent to one switch and the brush or contact 77 together with the other brush 85 being equivalent to a second switch.

When the follower 21 is rotated by one of the motors to restore the normal relationship between the follower and the director, friction is created between the follower and the brush member 77 of the director and this friction creates an undesirable tendency for the director to rotate with the follower. This tendency is not troublesome but suitable means may be provided to overcome the tendency. For example, the radial rod constituting the director 20 may extend through a slot 114 in an upright arcuate plate 115 that is positioned adjacent the follower 21 concentrically thereof. The outer end of the radial rod 70 is provided with a handle 116 which is adapted to make frictional contact with the arcuate plate 115 and thereby frictionally retain the director 20 in position.

As shown in Figure 3a the handle 116 is a hollow cylindrical body that is closed at its outer end and slidingly embraces the director rod at its inner end. A coiled spring 117 inside the handle 116 is in compression between the inner end of the handle and a collar 118 that is fixedly mounted on the end of the director rod 70. Thus the spring 117 continually urges the handle 116 against the surface of the arcuate plate 115 with sufficient pressure to overcome any tendency for the director 20 to rotate with the follower 21.

Preferably a radial pin 120 is mounted on the collar 118 for cooperation with a bayonet slot 121 in the handle 116. When the handle 116 is in the rotary position shown in Figure 3b the bayonet slot 121 permits the sleeve 116 to press against the plate 115 in response to the coiled spring 117. When the handle 116 is rotated to the position shown in Figure 3c the bayonet slot 121 cooperates with the radial pin 120 to hold the handle 116 retracted from the surface of the plate 115 to make the director 20 freely rotatable.

The manner in which this first embodiment of the invention serves its purpose may be readily understood from the foregoing description. It is apparent that the director 20 serves as a remote control means for power-actuation of the rudder 23. Normally the director 20 and the rudder 23 are aligned in the same direction as shown in Figure 2 and whenever the director 20 is rotated in either direction from this normal alignment with the rudder 23 one of the two motors 24 and 25 will be energized to restore the normal relationship by rotation of the rudder 23. Thus the rudder 23 follows the movements of the director 20 in much the same manner that the rudder would follow the movements of a tiller directly connected with the rudder.

The second embodiment of the invention shown in Figures 8 and 9 includes an upright shaft 22a which corresponds to the upright shaft 22 of the first embodiment of the invention and which is connected in the same manner with the rudder 23 and with the reversible motor means comprising the two motors 24 and 25. The shaft 22a extends upward through a bearing 125 in a support structure 126 and fixedly carries at its upper end a suitable follower 21a, the shaft being directly connected to a bottom plate 127 of the follower. This bottom plate carries a pair of arcuate contact plates 84a and 85a which cooperate in the previously described manner with a brush member 77a on a director generally designated by numeral 20a. The two arcuate contact plates 84a and 85a are mounted on a block 128 of insulating material at one end of the bottom plate 127.

The director 20a is rotatably mounted by pivots 142 in a frame of open construction, generally designated by numeral 130, which comprises a bottom casting 131 and a top casting 132 interconnected by an upright frame casting 133. The bottom casting 131 is mounted on the bottom plate 127 by suitable screws 134 and is formed with a circular shoulder 135 for engagement by the circular lower end of the frame casting 133. The frame casting 133 includes two upright webs 136 and has a circular upper end in engagement with a corresponding circular shoulder 137 on the under side of the top casting 132.

The director 20a, which has a radial handle 141 for manual operation, comprises a rectangular cage which carries a brush member 77a in the form of a spring wire finger. The rectangular cage compressing the director 20a is mounted inside the open frame 130 for rotation about an upright axis and for this purpose the rectangular cage is mounted on a pair of upper and lower pivot means 142. An inner cage 147 is provided with trunnions 148 by means of which it is pivotally mounted inside the rectangular cage 20a for rotation relative thereto about a horizontal axis. Mounted inside the inner cage 147 is a gyroscope housing 150 containing a motor driven gyroscope fly wheel (not shown) on a shaft 151. The two ends of the shaft 151 are journalled under bearing blocks 152 that are removably secured by screws 153.

This second embodiment of the invention operates in substantially the same manner as the first embodiment of the invention when the gyroscope is de-energized. When the gyroscope is energized, however, it tends to maintain the director 20a in a constant direction in space and thus tends to hold the boat on any course to which the director may be set. The course may be changed simply by grasping the handle 141 and forcibly turning the director 20a to a new direction in opposition to the resistance or the gyroscope. Thus the invention provides a gyro-pilot arrangement of extreme simplicity.

In the third embodiment of the invention shown in Figures 10 to 13 the shaft 22b that corresponds to the previously mentioned shaft 22 extends upward through a fixed circular plate 160 and has a collar 161 fixedly mounted on its upper end. Mounted on the shaft 22b below the collar 161 is a follower 21b in the form of an inner eccentric member, the inner eccentric member being keyed to the shaft by a spline 163. This eccentric follower member 21b rotatably nests inside a director 20b in the form of a second eccentric member. A suitable handle in the form of a radial rod 164 is mounted radially on the outer eccentric director 20b.

Figure 13:
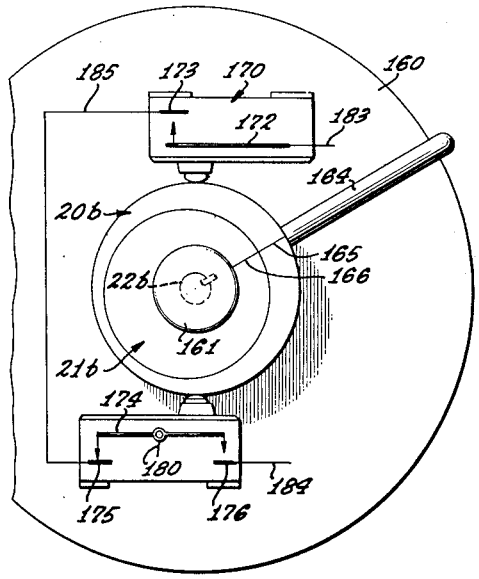
Figure 11:
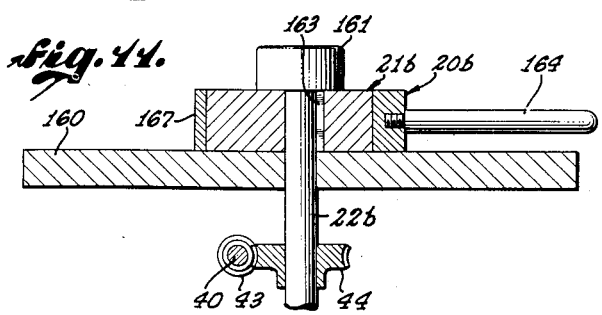
Figure 11 is a section taken as indicated by the line 11—11 of Figure 10.

The outer eccentric director 20b has an index mark 165 in alignment with the handle 164 and the inner eccentric follower 21b has a similar index mark 166. At the normal relative positions of the director 20b and the follower 21b the two index marks 165 and 166 register with each other as shown in Figures 10 and 13.

It will be noted that the index mark 165 coincides with the maximum radial dimension of the outer eccentric member 20b and the index mark 166 coincides with the minimum radial dimension of the inner eccentric 21b. The peripheries of both of the eccentric members have the configurations of true circles and at the normal relative positions of the two eccentrics the cylindrical peripheral surface 167 of the outer eccentric director 20b is precisely concentric with the axis of the upright shaft 22b. If the outer eccentric director 20b is rotated away from its normal position relative to the inner eccentric follower 21b the outer eccentric director will be shifted bodily out of its normal concentric position.

Fixedly mounted on the circular plate 160 on opposite sides of the outer eccentric follower 20b are two microswitches 170 and 171. As shown in Figure 10 the microswitch 170 has a switch arm 172 which is normally spaced away from a corresponding switch contact 173 and the microswitch 171 has a pivotally mounted switch arm 174 which normally touches a switch contact 175 in a position spaced from a second switch contact 176.

As shown in Figure 10, one side of the E.M.F. source 104 is connected to one side of each of the two motors 24 and 25 by wires 181 and 182. The second side of motor 24 is connected to the switch arm 172 by a wire 183 and the second side of the motor 25 is connected to the contact 176 by a wire 184. Finally, the contacts 173 and 175 of the two microswitches respectively are interconnected by a wire 185.

Figure 12:
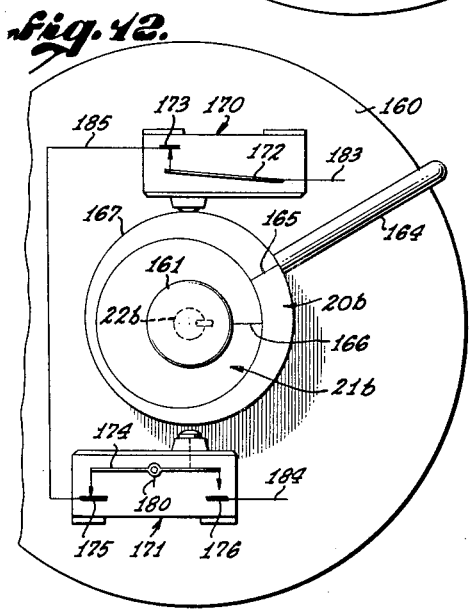
Figures 12 and 13 are similar views to Figure 10 showing the control members in different positions.

The manner in which this third embodiment of the invention operates may be understood by comparing Figures 10, 12 and 13. In the initial normal positions of the director 20b and the follower 21b shown in Figure 10, the outer eccentric director 20b is in its normal position concentric to the axis of the shaft 22b and both of the microswitches 170 and 171 are in their normal states. At this time motor 24 is de-energized because the switch arm 172 is spaced away from the contact 173 and the motor 25 is de-energized because the switch arm 174 is faced away from the contact 176.

If the outer eccentric director 20b is rotated away from the initial normal position shown in Figure 10 to the position shown in Figure 12, the outer eccentric 20b will be shifted bodily toward the microswitch 170 to cause the microswitch to close the following circuit for energizing motor 24, wire 181 from one side of the E.M.F. source 104 to one side of the motor 24, wire 183 from the other side of the motor 24 to the switch arm 172, wire 185 from switch contact 173 to switch contact 175, switch arm 174, and wire 180 to the second side of the E.M.F. source 104. The closing of this motor circuit causes the inner eccentric follower 20b to be rotated counter-clockwise until the normal concentricity of the outer eccentric director 20b is reestablished with the two index marks 165 and 166 in register with each other at the new orientation as shown in Figure 13. This restoration of the inner eccentric follower 21b to its normal position relative to the outer eccentric director 20b causes the rudder of the boat to be brought into alignment with the handle 164 at the new position of the handle.

If the handle 164 is shifted from the initial normal position in the opposite rotary direction the outer eccentric director 20b will operate the second microswitch 171 to close the following circuit through the motor 25: wires 181 and 182 from one side of the E.M.F. source 104 to one side of the motor 25, wire 184 from the other side of the motor to switch contact 176, switch arm 174, and wire 180 to the other side of the E.M.F. source 104.

It is apparent that the two microswitches 170 and 171 are electrically interlocked in the sense that the switches are wired in such manner that neither switch can operate to close the corresponding motor circuit without preventing the other switch from closing the other motor circuit. Thus the microswitch 170 can close the circuit through the motor 24 only when the second microswitch 171 is in its normal state because in the required motor circuit the two switches function in series; on the other hand, microswitch 171 cannot be operated to close the circuit through the motor 25 without making the microswitch 170 ineffective because the operation of the microswitch 171 separates the switch arm 174 from the contact 175 to destroy the required series relationship between the two microswitches.

In the fourth embodiment of the invention shown in Figures 14 to 17, an upright shaft 22c carries at its upper end a follower 21c in the form of a casting that is fixed with respect to the shaft by a suitable spline 190. The upper portion of the follower casting 21c is in the form of a cam 191 and the lower portion of the casting is in the form of a circular disc 192 having a radial flange 193 at its bottom edge. A director 20c in the form of a ring rotatably embraces the circular disc portion 192 of the casting and slidingly rests on the radial flange 193. The director ring 20c has the usual radial handle 195 and at the normal relative positions of the director and the follower shown in Figures 14 and 17 an index mark 196 on the director registers with a similar index mark 197 on the follower.

It is contemplated that suitable switches will be mounted on the director ring 20c for actuation by the cam 191 of the follower 21c but it will be readily appreciated that the arrangement may be reversed with cam-actuated switches on the follower adapted for actuation by relative rotation of the director.

In the construction shown, two switches 200 and 201 are mounted on the director ring 20c and each of these switches has an operating arm 202 that carries a roller 203 in contact with the peripheral surface of the cam 191. In this instance the cam 191 has a concentric inner dwell 204 and a concentric outer dwell 205 with sloping shoulders 206 and 207 at the junctures of the dwells.

At the normal relative positions of the director 20c and the follower 21c the switch rollers 203 are at the crests of the shoulders 206 and 207 at the two ends of the outer dwell 205. The two switches are normally open and require pressure contact against the outer dwell 205 to remain open. Each of the switches closes as soon as its roller 203 rides down the corresponding shoulder 206 or 207 away from the outer dwell 205. It can be seen in Figure 14 that an exceedingly small degree of rotation of the director 20c relative to the follower 21c will cause one of the rollers to move down the slope of the corresponding shoulder to cause the corresponding switch to close.

Figure 14:
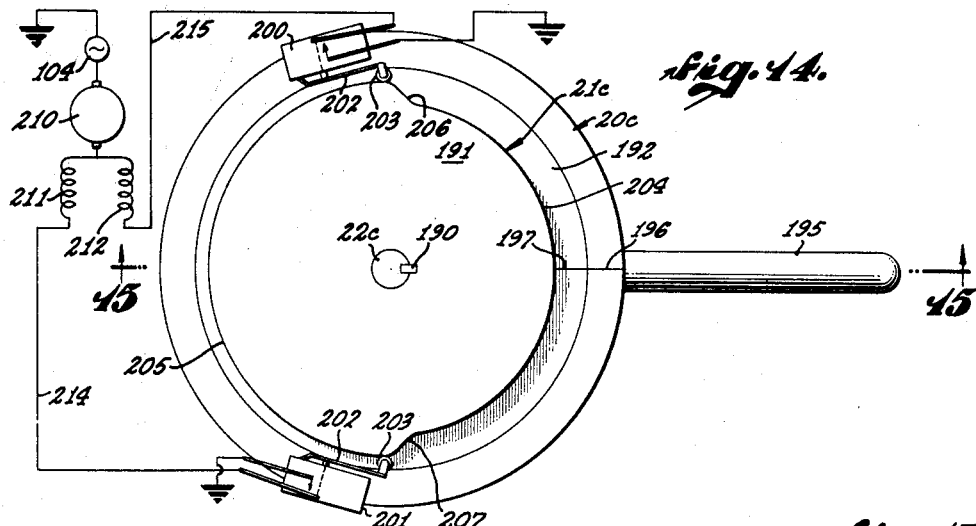
Figure 14 is a schematic plan view of the two control members and associated switches in a fourth embodiment of the invention.

This embodiment of the invention illustrates the fact that a single reversible motor may be substituted for the two previously described motors 24 and 25. Thus the wiring diagram in Figure 14 shows a motor 210 with two oppositely wound field coils 211 and 212. One side of the motor 210 is connected to one side of an E.M.F. source 104, the other side of the E.M.F. source being grounded. The field coil 211 is connected to one side of the switch 201 by a wire 214, the other side of this switch being grounded. In like manner field coil 212 is connected by a wire 215 with one side of the switch 200, the second side of the second switch being grounded.

Figure 16:
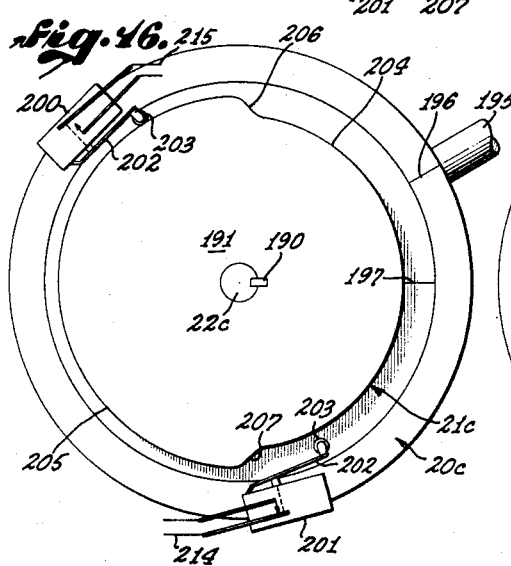
Figures 16 and 17 are views similar to Figure 14 showing the two control members in different positions.
Figure 17:
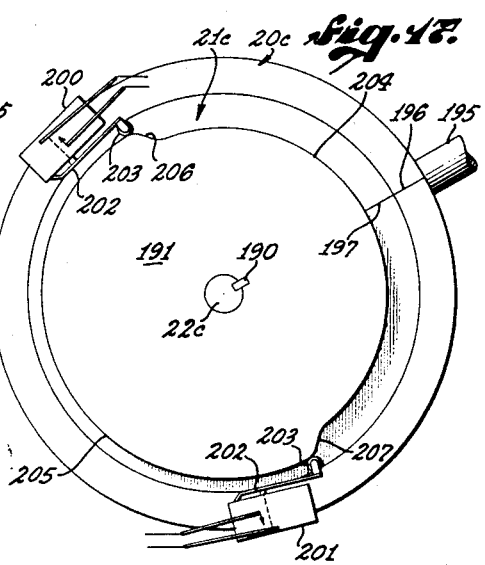
Figure 15:
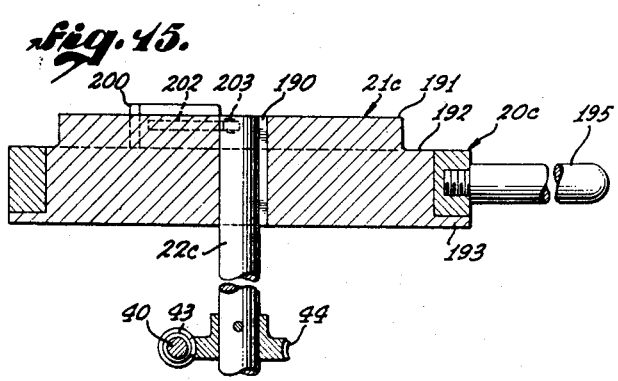
Figure 15 is a section taken as indicated by the line 15—15 of Figure 14.

When the follower 20c is rotated out of its normal relative position shown in Figure 14 to the position shown in Figure 16 the outer dwell 205 of the cam 191 is rotated away from the switch 201 and thus permits the switch to close thereby to complete a motor circuit through the field coil 211 for rotation of the motor in a direction to restore the normal relationship between the director and follower. As a result the motor brings the index mark 197 into register with the index mark 196 at the new position of the director as shown in Figure 17, and at the same time brings the rudder 23 into the same alignment. In like manner movement of the director 20c in the opposite direction away from its normal relative position will close a motor circuit through the second field coil 212 for rotation of the motor in the opposite direction to restore the normal relationship between the director and the follower.

In the embodiment of the invention shown in Figures 18 and 19 a director 20d in the form of a sleeve nut is rotatably mounted on a follower 21d in the form of a screw. The follower screw 21d is a longitudinal portion of a horizontal shaft 220 that has the same functions as the previously mentioned shaft 22.

The shaft 220, which is mounted in a pair of bearings 21, is operatively connected to the rudder 23 as indicated by the broken line 223. Two motors 224 and 225 that are wired for rotation in opposite directions are suitably connected to the shaft 220 for selective energization to rotate the shaft in opposite directions. Each of the motors carries a drive sprocket 226 which is connected by a sprocket chain 227 with a corresponding sprocket 228 on the motor shaft.

In the construction shown, a steering wheel 230 for use by the pilot is journalled by a shaft 231 in an upright support 232 and is operatively connected to the director nut 20*d*. For this purpose the director nut may be provided with suitable circumferential sprocket teeth and may be connected by a sprocket 235 on the steering shaft 231.

Any suitable means may be provided to energize the two motors 224 and 225 selectively in response to longitudinal shift of the director nut 20*d* in either direction relative to the follower screw 21*d* on which it is mounted. In this instance a pair of microswitches 238 and 240 are mounted in the path of movement of one end of the director nut. Both of these switches are normally open but microswitch 238 closes when the sleeve nut 20*d* shifts to the right as viewed in Figure 18 and the microswitch 240 closes when the sleeve nut shifts to the left. Thus, as shown in the wiring diagram in Figure 19, the operating member 241 of the microswitch 238 closes the corresponding switch arm 242 when the director nut 20*d* shifts to the right and the operating member 244 of the second microswitch 240 follows leftward movement of the sleeve nut to close the corresponding switch arm 245.

The wiring diagram shown in Figure 18 includes a pair of leads 248 and 250 from a suitable source of E.M.F. (not shown). The circuit for energizing motor 224 includes: wire 251 from lead 248 to one side of microswitch 238; wire 252 from the second side of the microswitch to one side of the motor 224; the wire 253 from the second side of the motor to lead 250. In like manner the circuit for energizing the motor 225 includes a wire 255 from lead 248 to one side of the microswitch 240, a wire 256 from the second side of the microswitch to one side of the motor 255, and a wire 257 from the second side of the motor to lead 250.

The operation of this last embodiment of the invention may be readily understood from the foregoing description. It is apparent that whenever rotation of the steering wheel 230 shifts the director nut 20*d* in either longitudinal direction from its normal position relative to the follower screw 21*d* the corresponding motor will be energized to rotate the screw in the direction and to the extent required to reestablish the normal relationship between the director nut and the follower screw. Thus the shaft 220 automatically follows rotation of the director nut 20*d* and thereby automatically follows rotation of the steering wheel 230 to cause the rudder 23 to change position in accord with the rotation of the steering wheel 230.

My description in specific detail of selected embodiments of the invention, by way of example and to illustrate the principles involved, will suggest various changes, substitutions and other departures from my disclosure that properly lie within the spirit and scope of the appended claims.

I claim:

1. A power steering unit for installation for remote control of a steering means, said unit having in combination: a rotary follower member for operative connection with said steering means for rotation of the steering means synchronous with the follower member; a director member adjacent said follower member and rotatable about the same axis as the follower member independently of the follower member, said director member having a normal neutral rotary position relative to the follower member; power means operatively connected with said follower member for actuation thereof and consequent synchronous rotation of the steering means; a first control means to energize said power means for actuation of said follower member in one rotary direction in response to rotation of said director member in said one rotary direction away from its normal neutral position relative to said follower member thereby to cause corresponding rotation of said steering means and said follower member until the normal neutral position of the director member relative to the follower member is restored; and a second control means to energize said power means for actuation of said follower member in the opposite rotary direction in response to rotation of said director member in said opposite rotary direction away from its normal neutral position thereby to cause corresponding rotation of said steering means and said follower member until the normal neutral position of the director member relative to the follower member is restored, said follower and director members being nested eccentric members and said two control means being positioned adjacent the periphery of the nested members for actuation by radial extension and contraction of the overall configuration of the nested members arising from relative rotation therebetween.

2. A combination as set forth in claim 1 in which the portions of the two eccentric members of greatest radial dimension are diametrically opposite each other at said predetermined normal position of the director member relative to the follower member.

3. A combination as set forth in claim 2 in which said nested eccentric members at their normal predetermined relative positions have an overall configuration that is substantially a true circle.

4. A power steering unit for installation for remote control of a steering means, said unit having in combination: a rotary follower member for operative connection with said steering means for rotation of the steering means synchronous with the follower member; a director member adjacent said follower member and rotatable about the same axis as the follower member independently of the follower member, said director member having a normal neutral rotary position relative to the follower member; power means operatively connected with said follower member for actuation thereof and consequent synchronous rotation of the steering means; a first control means to energize said power means for actuation of said follower member in one rotary direction in response to rotation of said director member in said one rotary direction away from its normal neutral position relative to said follower member thereby to cause corresponding rotation of said steering means and said follower member until the normal neutral position of the director member relative to the follower member is restored; and a second control means to energize said power means for actuation of said follower member in the opposite rotary direction in response to rotation of said director member in said opposite rotary direction away from its normal neutral position thereby to cause corresponding rotation of said steering means and said follower member until the normal neutral position of the director member relative to the follower member is restored, said first and second control means being cam-actuated control means mounted on one of said two members for rotation therewith, the other of said two members being provided with eccentric surfaces for actuating said two control means.

5. A power steering unit for installation for remote control of a steering means, said unit having in combination: a rotary follower member for operative connection with said steering means for rotation of the steering means synchronously with the follower member; power means operatively connected with said follower member for actuation thereof and consequent synchronous rotation of the steering means; a director member rotatable on the same axis as said follower, said director member having a normal neutral rotary position relative to the follower member; a first pressure-responsive control means fixedly connected with said follower member for movement therewith to energize said power means for actuation of the follower member in one rotary direction in response to rotation of said director member in one rotary direction away from its normal neutral position relative to said follower member; and a second pressure-responsive control means to energize said power means for actuation of said follower member in the opposite rotary direction in response to rotation of said director member in the opposite rotary direction from its normal neutral position relative to said follower member, said first and second control means being positioned radially of said director member outside the periphery thereof for wiping contact therewith to avoid interference with rotation of the director member, said director member being of a configuration to operate said first and second control means by peripheral cam action.

6. A combination as set forth in claim 5 in which said follower member has an eccentric circular peripheral surface, said director member being journaled on said peripheral surface; and in which said director has a circular peripheral surface that is ecentric with respect to said first mentioned circular peripheral surface for actuation of said first and second control means.

7. A combination as set forth in claim 6 in which the eccentricity of said eccentric peripheral surfaces are substantially equal with the two eccentricities opposite to each other and with the circular eccentric surface of the director member substantially concentric to the axis of rotation of the follower member at the neutral position of the director member relative to the follower member.

References Cited in the file of this patent

UNITED STATES PATENTS

| | | |
|---|---|---|
| 1,725,599 | Sperry | Aug. 20, 1929 |
| 2,416,275 | Yardeny et al. | Feb. 18, 1947 |
| 2,440,838 | Yardeny | May 4, 1948 |
| 2,463,498 | Buchanan | Mar. 1, 1949 |
| 2,505,555 | Levy | Apr. 25, 1950 |
| 2,583,059 | Neville | Jan. 22, 1952 |

FOREIGN PATENTS

| | | |
|---|---|---|
| 221,998 | Great Britain | Sept. 25, 1924 |
| 510,596 | Great Britain | July 3, 1939 |
| 592,405 | Great Britain | Sept. 17, 1947 |